June 1, 1948.  R. D. BENNETT  2,442,635
MACHINE TOOL
Filed Aug. 16, 1943  8 Sheets-Sheet 3
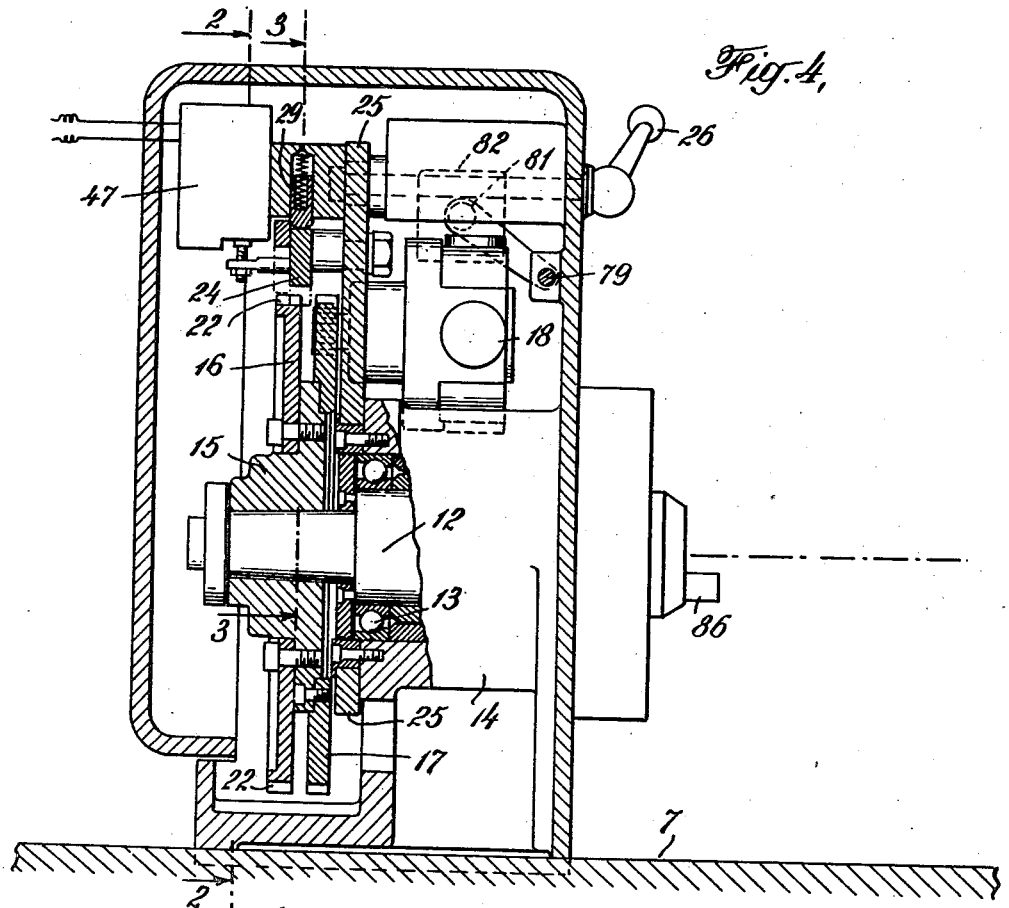
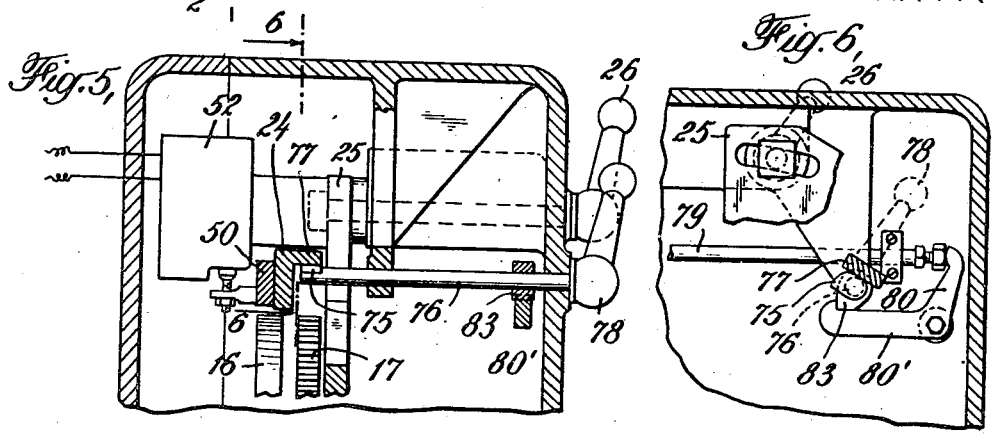
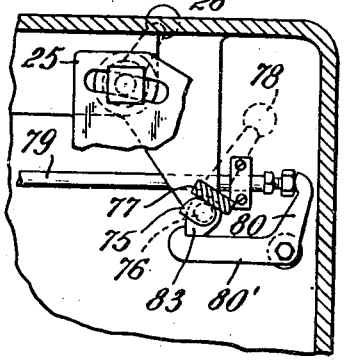
INVENTOR
RACY D. BENNETT
BY
Pennie, Davis, Marvin & Edmonds
ATTORNEYS June 1, 1948. R. D. BENNETT 2,442,635
MACHINE TOOL
Filed Aug. 16, 1943 8 Sheets-Sheet 4
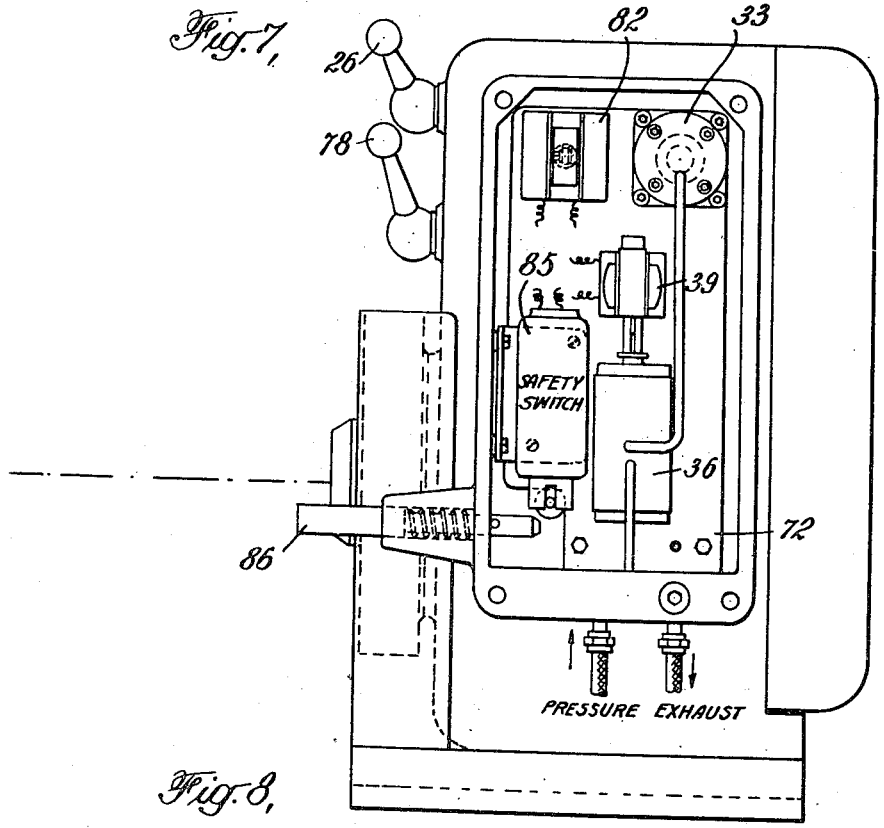
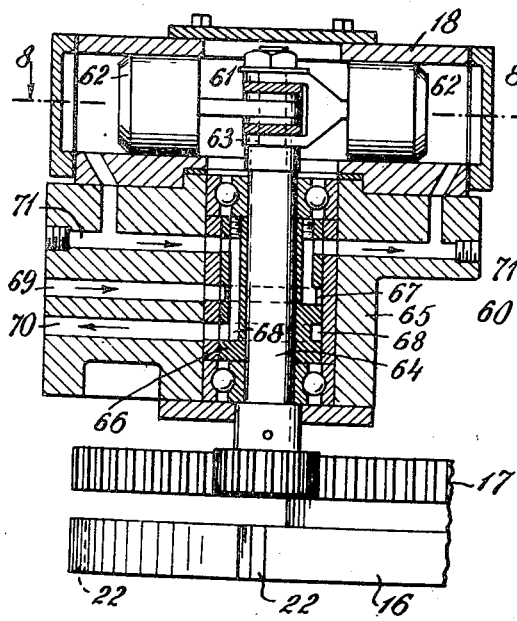
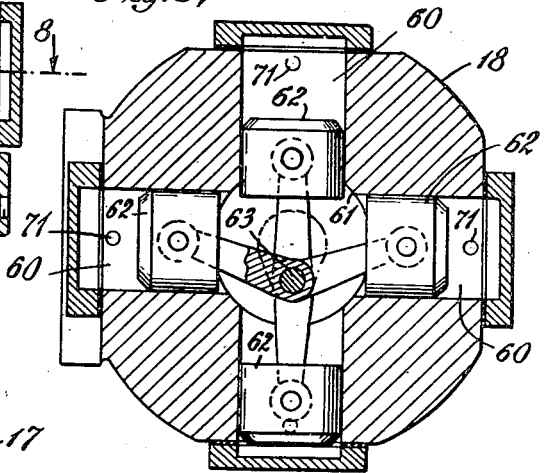
INVENTOR
RACY D. BENNETT
BY
Pennie, Davis, Marvin & Edmonds
ATTORNEYS June 1, 1948.  R. D. BENNETT  2,442,635
MACHINE TOOL
Filed Aug. 16, 1943 8 Sheets-Sheet 5

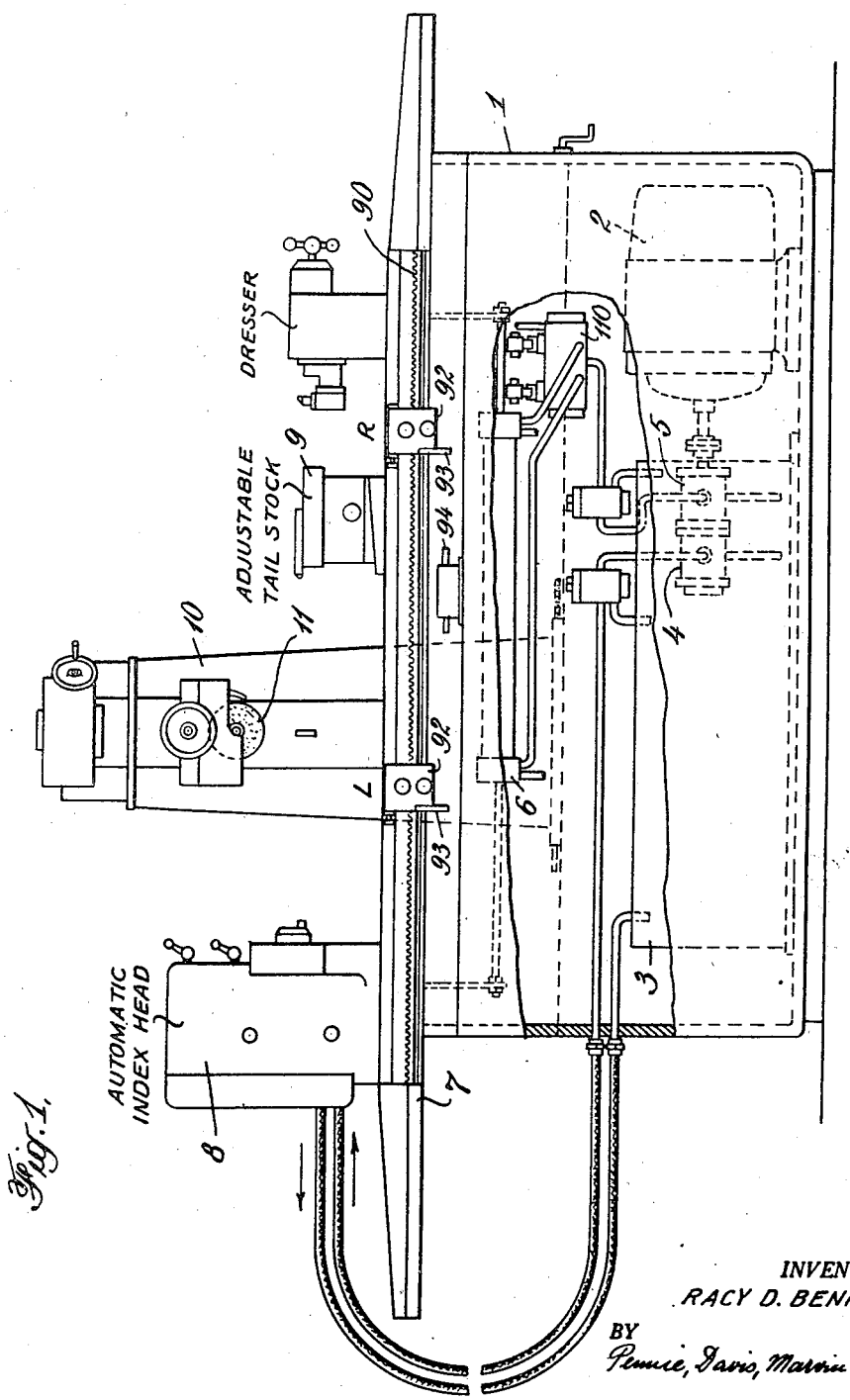

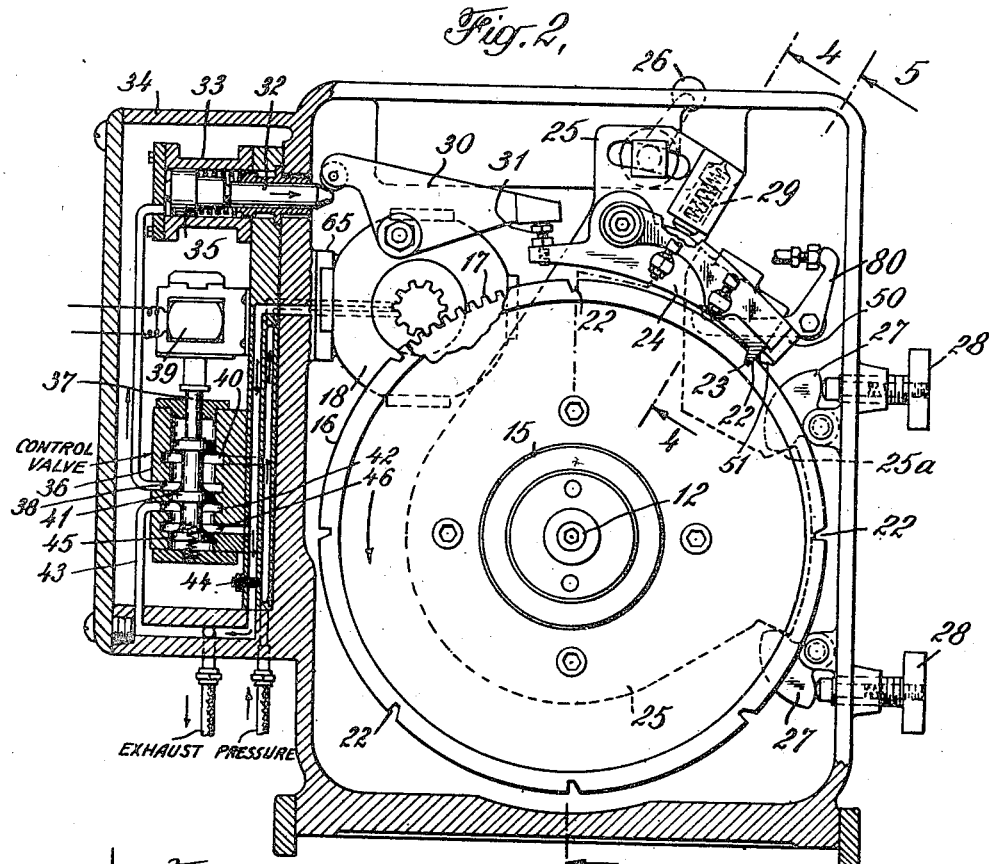
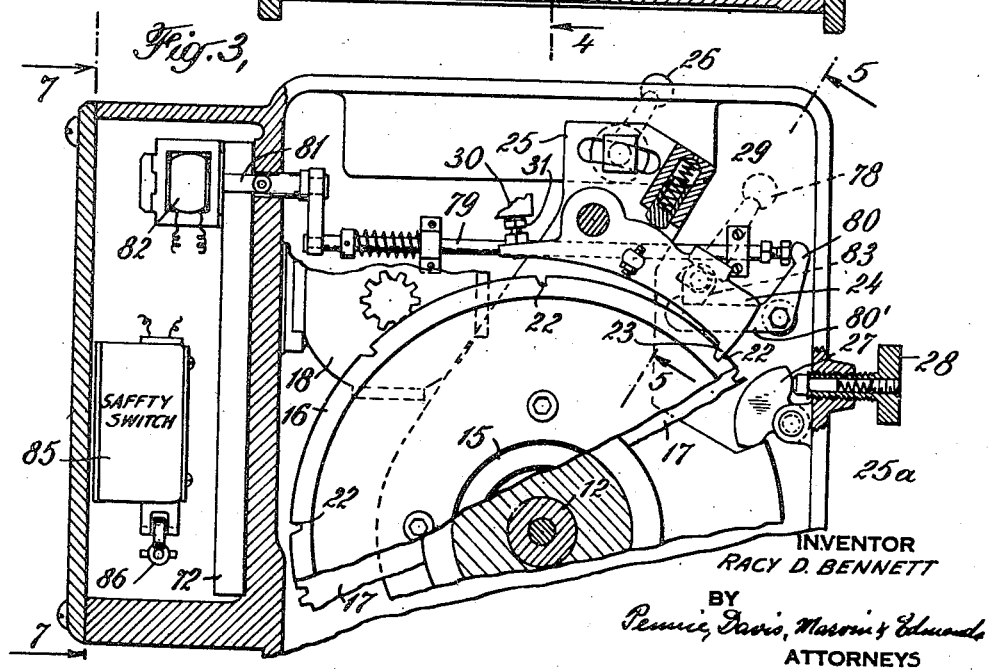

INVENTOR
RACY D. BENNETT
BY
Pennie, Davis, Marvin & Edmonds
ATTORNEYS

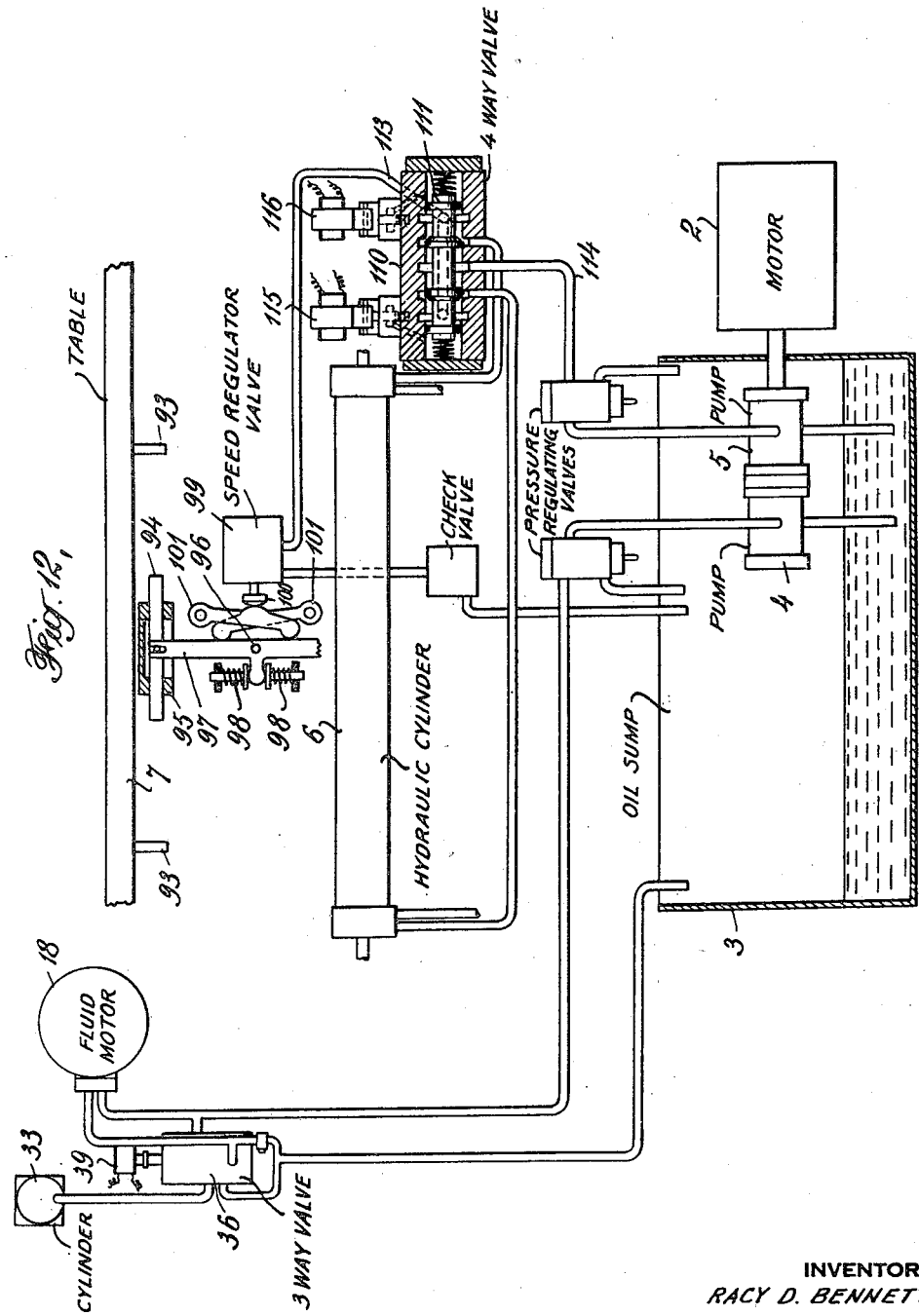

June 1, 1948.  R. D. BENNETT  2,442,635
MACHINE TOOL
Filed Aug. 16, 1943  8 Sheets-Sheet 8
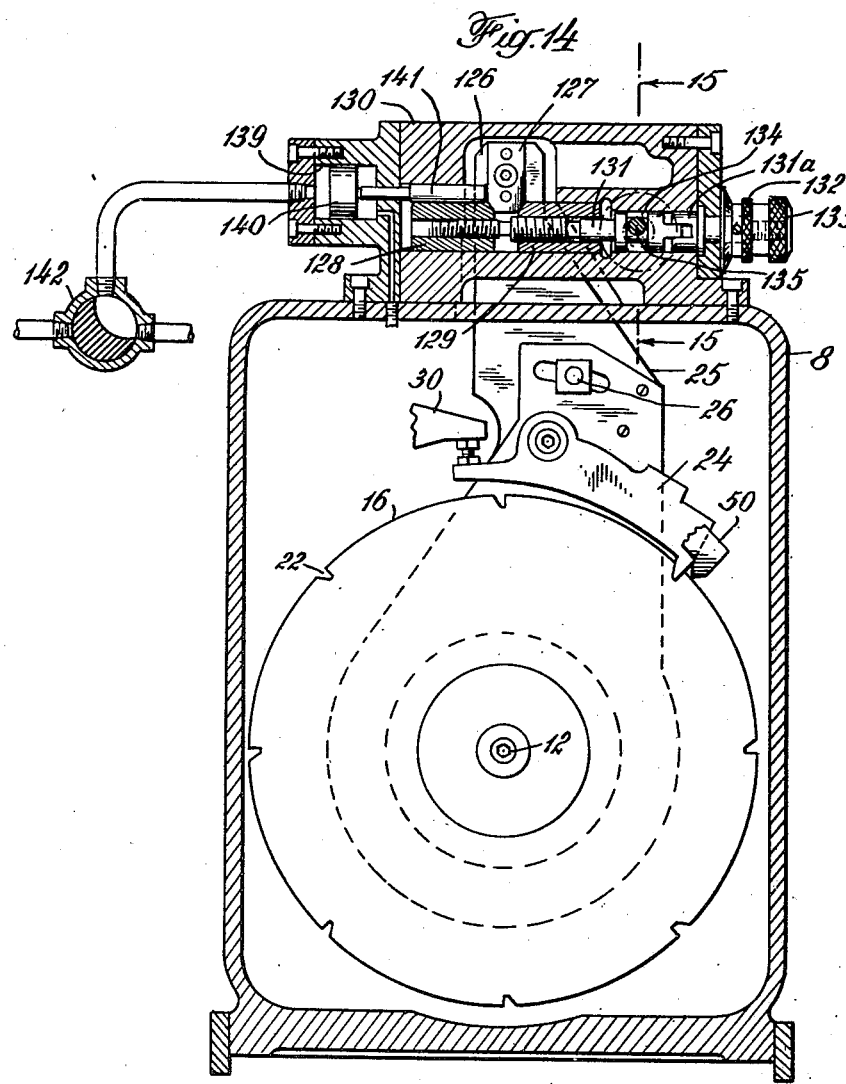
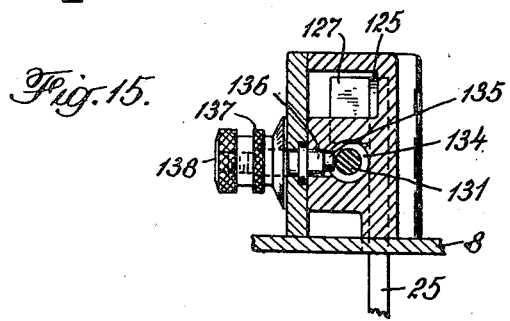
INVENTOR
RACY D. BENNETT
BY
ATTORNEYS Patented June 1, 1948

2,442,635

UNITED STATES PATENT OFFICE 2,442,635

MACHINE TOOL

Racy D. Bennett, Detroit, Mich., assignor to Vinco Corporation, Detroit, Mich., a corporation of Michigan Application August 16, 1943, Serial No. 498,763

10 Claims. (Cl. 51—233)

This invention relates to precision tools, such as spline and gear grinders.

The object of the invention is to provide a fully automatic machine which will effect the final shaping of gear teeth, splines and the like, with extreme accuracy and at the same time at a production rate heretofore possible only for work having much greater manufacturing tolerances.

One of the greatest difficulties in producing machine elements such as gears, splined shafts and the like to accurate dimensions, that is, within tolerances of, say, plus or minus one ten-thousandth of an inch, is inaccurate indexing. In the ordinary indexing head a notched index wheel with the notches accurately spaced to the exact positions for the desired sequence of operations is attached to the work-supporting spindle and at each partial rotation of the spindle a tooth-supporting member carried by the indexing head is withdrawn from the notch and the work turned through the necessary angle for the tooth to engage the next succeeding notch. Exact accuracy in positioning the notches in the index wheel will not, however, insure accurate indexing unless such factors as lost motion, momentum of moving parts, vibration, and other similar factors, are taken care of, and one of the objects of my invention is to provide an improved indexing mechanism which eliminates or so reduces such factors that the quantity production of gears and splines with tolerances of less than one ten-thousandth may be successfully carried out.

A further object of the invention is to provide an improved means for controlling the movement of the work-carrying table with respect to the grinding wheel or other tool whereby the speed of movement of the table, its acceleration and deceleration, as well as its amplitude of movement may be accurately and automatically controlled through a wide range.

A further object of the invention is to provide an automatic cycle control for a machine tool of this character whereby the movements of the table and indexing head may be variously modified to produce different cycles of operations which are automatically repeated any desired number of times.

A further object of the invention is to provide an automatic machine of the character described wherein failure of any of the operating parts of the machine will cause an instant stoppage of the machine without damage to the grinding wheel or other tool or the work.

A further object of the invention is to provide an improved indexing head which not only gives accurate indexing, but may also be given predetermined additional movements for certain special operations as will be later described.

In the accompanying drawings I have illustrated a preferred embodiment of my invention, the particular machine illustrated being an automatic spline grinder for grinding the splines of aircraft engines to receive the propellers. The tolerance permitted in grinding splines of this character is plus or minus two ten thousandths of an inch. The machine illustrated will automatically grind splines within these limits at much greater speeds than heretofore obtainable within tolerances of this order.

Referring to the drawings:

Figure 1 is a side elevation of my improved gear or spline grinder showing the general arrangement of the parts without structural details;

Fig. 2 is an end elevation, a portion of the figure being in section on line 2—2 of Fig. 4, of the indexing head looking from the left of Fig. 1 with the cover removed;

Fig. 3 is a transverse vertical section on line 3—3 of Fig. 4;

Fig. 4 is a vertical longitudinal section on line 4—4 of Fig. 2;

Figs. 5 and 6 are detail sectional views of parts of the indexing head which will be later described;

Fig. 7 is a side elevation of the indexing head with the adjacent cover removed;

Figs. 8 and 9 are sectional views of the hydraulic motor employed for driving the index head;

Fig. 1 is a detail view on an enlarged scale showing a portion of the mechanism for controlling the operation of the table;

Fig. 12 is a diagrammatic view showing the hydraulic circuit for operating the indexing head and the work-supporting table;

Fig. 14 is a sectional view of a modified indexing head whereby the work may be turned backward and forward through limited distances without interfering with accurate indexing; and Fig. 15 is a detail view on line 15—15 of Fig. 14.

Figure 11:
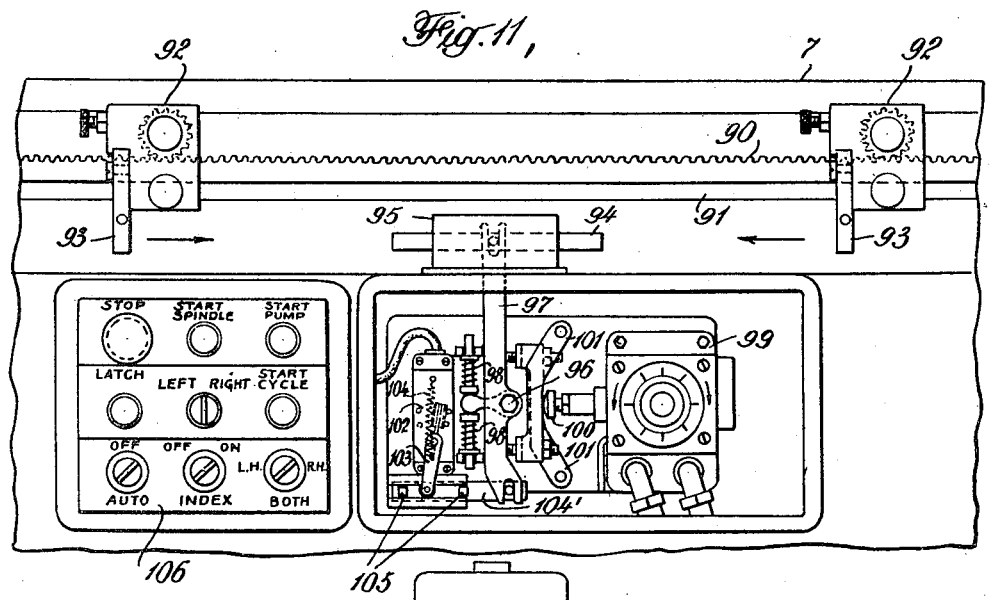

In the drawings I have illustrated a spline grinder of the type wherein the grinding wheel is supported on a stationary column and the shaft with the splines to be ground is carried by a longitudinally reciprocating table which moves the shaft back and forth during the grinding operation. Referring to Fig. 1, the base of the machine is indicated at 1 which is preferably a hollow box-like structure containing the electric motor 2, the oil sump 3 and the pumps 4 and 5, which supply the operating fluid under pressure for shifting the reciprocating table 7 and operating the hydraulic motor through which the indexing head is rotated. The pump 5 is connected through a suitable control valve system, shown in greater detail in Fig. 12, to a cylinder 6 whose piston is connected to the reciprocating table 7 on which the indexing head 8 and tail stock 9 are supported. It will be understood that the indexing head and tail stock are mounted on the reciprocating table for longitudinal adjustment in the usual manner. The column 10 which carries the grinder 11 is also mounted for adjustment on a track extending along one side of the frame 1. The table 7 is provided with adjustable stops 92, see Fig. 11, which engage and operate at each movement a trip rod 94 mounted for limited movement on the fixed frame of the machine. The position of the stops 92 determines the extent of travel of the table, and the movement of the rod 94 trips a control switch which initiates the next operation in the cycle for which the control mechanism is set.

In the operation of the machine the shaft on which the splines are to be ground is supported between the centering pins of the indexing head and the tail stock and the table is set in motion to reciprocate the shaft longitudinally beneath the grinding wheel, with the periphery of the grinding wheel engaging the spline on the upper side of the shaft. At each back-and-forth movement of the table or at any other desired interval, the indexing head is rotated a partial revolution to bring the next spline on the circumference of the shaft into alignment with the grinding wheel. The locking mechanism of the indexing head maintains the shaft accurately in position during the reciprocation of the table and when the table is at rest the indexing head is operated to give the work another partial rotation and thus bring the next succeeding spline into line with the grinding wheel. This operation is repeated until all the splines are ground to a proper depth and shape.

I will first describe my improved indexing head. The centering pin of the indexing head is carried by a shaft 12 mounted in ball bearings 13 carried in a journal 14 cast integrally with the casing of the indexing head (see Fig. 4). The shaft 12 projects to the rear beyond this bearing and is provided with a rigidly attached hub 15 to which the indexing wheel 16 is fixedly attached by any suitable means. Also attached to the hub 15 is a gear 17 through which the shaft 12 of the indexing wheel is rotated by means of a small fluid motor 18 supported on the adjacent wall of the casing as illustrated in Fig. 2, and with its driving pinion in mesh with the gear 17. Any suitable type of hydraulic motor may be employed, but I preferably employ a motor of the radial cylinder reciprocating piston type such, for example, as shown in Figs. 8 and 9. Liquid under constant pressure is delivered to the fluid motor by the pump 4 and returned to the sump through flexible hose connections as illustrated in Fig. 1.

The index wheel 16 (see Fig. 2) has a series of peripheral notches 22 accurately spaced the desired distance apart and shaped to fit a locking tooth 23 on the end of a rocker arm 24 which is carried by a supporting plate 25 as shown more particularly in Figs. 3 and 4. As here shown the plate 25 is supported on a bearing attached to the face of the journal 14 between the hub 15 and the main bearing 13. The supporting plate 25 is locked in adjusted position by a clamping bolt 26 mounted in the side wall of the casing and working through an arcuate slot in the upper portion of the supporting plate.

For accurately positioning the supporting plate I preferably provide a micrometer adjustment consisting of two cams 27 pivotally mounted on the wall of the casing and positioned to engage on the opposite sides of the laterally projecting arm 25a on the supporting plate 25. Adjusting screws 28 are threaded through the wall of the casing with their rounded ends engaging the opposite faces, respectively, of the cams 27.

The arm 24 is pressed against the periphery of the index wheel by a spring-pressed plunger 29 mounted on the plate 25, and when the notches 22 in the periphery of the index wheel successively reach positions in registry with the tooth 23, the indexing wheel will be stopped and held against rotation until the arm 24 is rocked against the tension of the spring 29. For rocking the arm 24 I preferably provide a second rocking member 30 one end of which bears on an adjusting screw 31 in the end of the rocking arm 24. The opposite end of the rocking arm 30 is provided with a cam roller resting against the tapered end of an operating pin 32 supported in the side wall of the casing and projecting at its opposite end into a cylinder 33 supported on the outer face of the wall within a housing 34 forming part of the casing. The cylinder 33 contains a plunger 35 which is spring-pressed toward the outer end of the cylinder, that is, in a direction to relieve the pressure on the operating pin 32. Fluid under pressure from the pressure line of the pump 4 leading to the hydraulic motor 18 is delivered to the cylinder 33 to operate the plunger 35 and pin 32 to thereby rock the arm 30 and lift the tooth 23 out of its notch in the index wheel.

The flow of fluid to the cylinder 33 is controlled by the control valve 36 which serves also to reduce the speed of the hydraulic motor 18 as the index wheel nears the completion of its movement. This valve is shown in Fig. 2 in position to admit fluid to the cylinder 33 but before the piston 35 has commenced its movement. It comprises a cylindrical valve casing and a piston valve 37 normally maintained in elevated position by a spring and pushed downward as shown by the solenoid 39 when its coil is energized. One port 38 of the valve casing is connected to the cylinder 33 by a pipe leading from port 38 and this port is cut off from the pressure port 40 when the valve is in elevated position by the middle head 41. In this position of the valve the port 38 is connected to the exhaust port 42 which is connected by a pipe 43 with the fluid return passage leading to the fluid supply sump 3.

The pressure line to the motor 18 is continuously open so that the motor maintains a continuous driving torque on the index wheel. The return line, however, is partially blocked off by a plug 44 having a passage of reduced diameter. Above the plug 44 the return line is connected to the valve chamber by a port 46 positioned to be closed by the lower head 45 of the valve 37 when the valve is in elevated position.

The valve 37 is operated to admit fluid under pressure to the cylinder 33 by the solenoid 39 when its coil is energized after the reciprocating table 7 comes to rest at the end of its movement in one direction. When the valve 37 is depressed by the solenoid the port 38 is connected to the pressure side of the circuit of the hydraulic motor and the piston 35 will shift the plunger 32 toward the right as shown in Fig. 2. The movement of the plunger 32 rocks the arm 24 and lifts the tooth 23 out of the notch in the periphery of the indexing wheel, permitting the latter to be rotated by the hydraulic motor 18. The circuit through the solenoid coil is broken shortly before the succeeding notch of the index wheel reaches the tooth 23 so that the spring within the cylinder 33 will return the pin 32 to its outward position, releasing the arm 24 which will be free to move under the action of the spring 29 when the next notch in the indexing wheel comes into registry with the tooth 23. When the circuit through the solenoid 39 is broken the valve 37 will be elevated by its spring, thereby cutting off the pressure from the cylinder 33 and connecting the port 38 to the exhaust port 42 so that the arm 24 will be released as described. The return of the valve to its upper position also reduces the speed of rotation of the indexing wheel, so that the impact of the notch with the tooth will be reduced to a negligible value and the indexing wheel will be brought to rest without jam or shock.

When the valve body 37 is depressed by the solenoid its lower head 45 uncovers the port 46, thereby providing an unrestricted flow of the exhaust fluid from the motor to the pipe 43 leading to the return passage, but when the valve is elevated by its spring as described the port 46 is cut off and the exhaust fluid from the motor must pass through the restricted passage in the plug 44.

For de-energizing the solenoid 39 as the index wheel nears the completion of its movement I provide a second rocker arm 50 mounted on the same pivot as the rocker arm 24, rocker arm 50 being provided with a tooth 51 which also rides on the periphery of the index wheel 16 in position to engage the notches 22 in the index wheel. The tooth 51 is beveled on its leading edge so as not to stop the rotation of the index wheel but to be lifted out of the notch by the continued rotation of the wheel. The arm 50 is positioned to rest by gravity on the periphery of the index wheel and as the notch 22 passes under the tooth 51 the tooth will drop into the notch, thereby opening a switch 52 (see Fig. 5) in the circuit of a relay which controls the operation of the solenoid 39. As the rotation of the index wheel proceeds the rear edge of the notch 22 will engage the beveled inner face of the tooth 51, thereby rocking the arm 50 and closing the switch 52. Closing the switch 52 does not, however, immediately reenergize the solenoid 39, because of the construction and operation of the relay as will be later described. The continued movement of the index wheel brings the notch into registry with the latch which drops into the notch, stopping the movement of the wheel, and closing a switch 47 which, as will be later described, starts the table on its return movement.

By reducing the impact in the manner described, the indexing wheel may be operated at a much higher rate of speed, reducing the period of dwell between the successive movements of the machine bed, and thereby speeding up the operation of the machine without increasing the speed of movement of the work with respect to the grinding wheel.

It is important that the pressure of the indexing wheel against the locking tooth 23 be constant so that the compression of the metal surfaces will be uniform. Otherwise, however exactly the index wheel is made, there will be a variation in the movement from one notch to another, depending upon the degree of pressure maintained between the parts at different times in the cycle of operations. I find that a hydraulic motor of the type disclosed, when operated by oil under constant pressure, will maintain a constant torque on the driving shaft of the motor and consequently a constant pressure between the index wheel and the locking arm.

This motor is illustrated in Figs. 8 and 9 and comprises a stationary block having four cylinders 60 bored radially in the block and communicating with a central crank chamber 61. The pistons 62 are connected to a common crank pin 63 which projects from the end of a crank shaft 64. The crank shaft is supported for rotation in a supporting block 65 which is bolted against the adjacent wall of the casing of the indexing head, as shown in Fig. 2. A rotary valve 66 is attached to the shaft 64 between the bearings and is provided with annular pressure and exhaust ports 67, 68, respectively, which in turn communicate with the pressure and exhaust passages 69 and 70 communicating with the pump 4.

Passages 71, formed by bores in the supporting block 65, communicate with the outer ends of the cylinders and successively connect the cylinders with the pressure and exhaust passages 69 and 70. The passages 69 and 70 register, when the motor is attached to the casing wall, with passages extending through the wall and registering in turn with passages formed in a base block 72 bolted against the outer face of the wall of the casing and furnishing a support, as shown in Fig. 2, for the control valve 36 of the solenoid 39 and the cylinder 33. This arrangement provides a convenient means for assembling the apparatus with few pipe connections.

In order that the rotation of the index wheel may be controlled by hand in making the initial setting of the machine or for any other purpose, there is provided a hand-operated cam 75 attached to the end of a rocker shaft 76 (see Figs. 5 and 6) and underlying a projection 77 formed on the rocker arm 24. The shaft 76 projects through the front wall of the casing and is provided with an operating handle 78. When the shaft 76 is turned by means of the handle 78 the cam 75 will raise the arm 24 to release the tooth 23 from engagement with the notches 22 in the index wheel.

To avoid inadvertent release of the index wheel while the machine is in operation there is preferably provided a lock for the shaft 76 which permits it to be turned only when the electric control system is disconnected. This mechanism comprises a rod 79 (see Fig. 3) supported in suitable guides on the adjacent wall of the casing for limiting the longitudinal movement. The end of the rod 79 engages a rocker arm 80 pivoted on the wall of the casing and at its opposite end is connected to the core 81 of a solenoid 82 which, when energized, holds the rod pressed against the rocker 80. The other arm of the rocker 80 is provided with a latch 80' positioned to engage a lug 83 on the shaft 76 and hold the shaft against movement. When the coil 82 is de-energized the arm 79 will be drawn to the left by its spring, releasing the lever 80 so that the locking arm 80' is free to drop out of engagement with the detent 83. As will be later described, the circuit of the coil 82 is controlled by a switch whose operation also serves to break the circuit of the electric control system.

Other safety devices may be provided if desired, for example, a safety switch 85 such as shown in Fig. 7 may be employed to cut off the driving motor of the pumps 4 and 5 in case the reversing mechanism for the table fails to operate in properly timed sequence. This switch is operated by a plunger 86 projecting through the front wall of the casing of the indexing head in position to be engaged by a lug on the supporting column of the grinding wheel and operate the rod 86 before the grinding wheel contacts the casing.

This safety device is particularly desirable for machines in which the grinding wheel and the indexing head are both adjustable on their respective bases. The movement of the reciprocating table is determined by the adjustment of the trips which operate the reversing switches at each end of the table's movement. If the trips are not properly adjusted an accident and consequent damage to the machine will be averted by the limit switch which will stop the reciprocation of the table before the grinding wheel contacts the index head.

Figure 10:
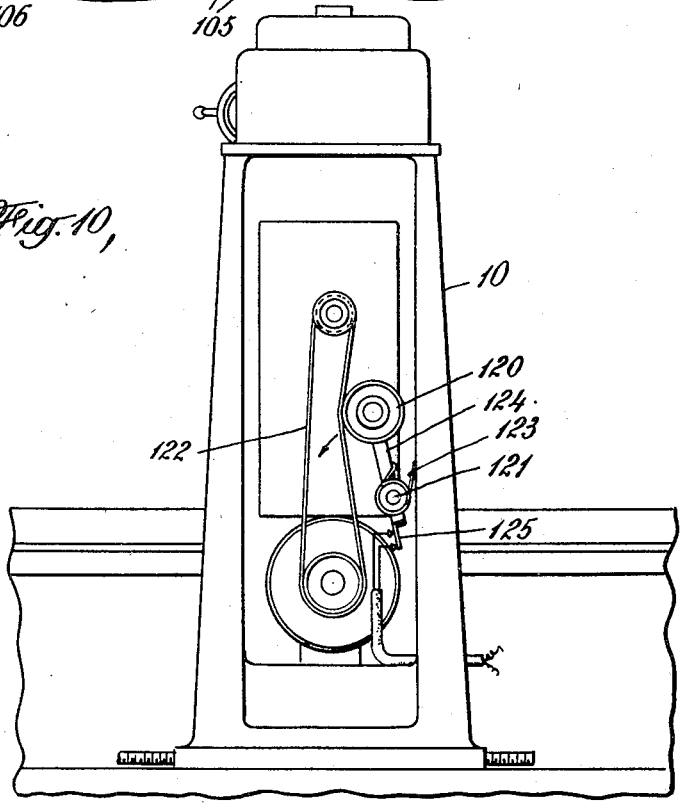
Fig. 10 is a detail view showing one of the safety switches.

In addition to the safety switch carried by the indexing head I preferably provide a second safety switch for breaking the main electrical circuit should the belt which drives the grinding wheel break. This safety switch is shown in Fig. 10 and as there shown comprises an idle pulley 120 pivoted at 121 within the standard which supports the grinding wheel in position to bear against the belt 122 through which the spindle of the grinding wheel is driven from its motor. The supporting arm 124 of the pulley 120 is pressed against the belt by a suitable spring 123, the belt thereby maintaining the supporting arm in substantially vertical position from which it will be shifted by the action of the spring should the belt break. The lower end of the supporting arm 124 is connected to a control switch 125 which I have illustrated diagrammatically as comprising a contact piece arranged to close the gap between two conductors when the arm is in substantially vertical position and to open the gap between the conductors when the arm swings toward the horizontal. It will be understood that the illustration is diagrammatic and that in practice a circuit breaker of usual construction will be employed.

In Fig. 11 I have illustrated the mechanical parts of the mechanism for controlling the reciprocation of the table. The table 7 is provided along its front edge with a rack 90 and a parallel trackway 91 on which is supported the adjustable blocks or stops 92 carrying depending fingers 93 positioned to engage at their lower ends the exposed ends of the trip rod 94 which, as described, is mounted for limited reciprocating motion in a bearing 95 supported on the stationary frame of the base. Supported on a fixed pivot 96 in a covered box beneath the bearing 95 is an upstanding lever 97 whose upper end is forked to engage a pin on the rod 94 so as to be turned on its pivot by movement of the rod in either direction. Lever 97 is maintained in vertical position by springs 98 and will be shifted in one direction or the other by the depending fingers 93 when these contact the end of the rod 94 as the table reaches the end of its movement as determined by the position of the blocks 92. Mounted in the box alongside the lever 97 is a combined speed regulating and deceleration valve 99 which serves to slow down the movement of the table when the lever 97 is shifted in either direction. The valve 99 is not shown in detail in this application but is preferably of the construction shown in my co-pending application Ser. No. 489,943, filed June 5, 1943, which has become abandoned. For the purpose of this case it will be understood that this valve is arranged in the discharge line from the hydraulic operating cylinder for the table and may be adjusted to regulate the normal rate of flow from the cylinder. In addition, upon movement of the control knob 100 toward the right as shown in Fig. 11, it serves to further throttle the rate of discharge of the operating fluid from the cylinder, to thereby reduce the speed of movement of the table. The knob 100 is operated by cross levers 101 arranged so that one lever will be shifted when the lever 97 is turned in one direction from its neutral vertical position, while the other lever 101 will be shifted when the lever 97 is turned in the opposite direction. By this arrangement knob 100 will be shifted to the right upon movement of the lever 97 in either direction from its central neutral position.

The lever 97 also operates a control switch 102 by means of which the indexing mechanism is set in operation at the end of the table movement. This switch is a two-position switch and as shown comprises a pivoted contact member 103 which in one position establishes connection between a pair of contacts at one side of its intermediate position and when swung to its opposite position closes another pair of contacts. The switch member 103 is held in one closed position or the other by a spring 104. The switch is thus in one closed position or the other and does not return to central position as does the lever 97 when the table starts its movement in the opposite direction. The switch member 103 is operated by a sliding bar 104' connected to the lower end of the lever 97 and provided with lugs 105 for engaging the member 103 when the lever is fully turned in one direction or the other.

Also shown in Fig. 11 is the control panel 106 in which are supported the switches for securing the desired predetermined cycle of operations. The construction and operation of these switches will be later described in connection with the control circuit illustrated in Fig. 13.

In Fig. 12 I have illustrated the hydraulic circuit for effecting the operation of the table and indexing head. As already described, two separate hydraulic circuits are employed. These pumps are driven continuously whenever the machine is in operation and through the pressure-regulating valves maintain constant operating pressure in their respective lines, which pressure may be accurately regulated and will be maintained regardless of the amount of oil flowing through the pressure line within wide limits. The pressure-regulating valve is not shown in detail, but is preferably of the type disclosed in my co-pending application Ser. No. 414,367, filed October 9, 1941, which has become abandoned. From the pressure-regulating valve for operating the table, the pressure line extends to a four-way solenoid valve 110 which controls the admission and discharge of oil from the opposite ends of the operating cylinder of the table in accordance with the predetermined cycle of operations for which the machine is set. This valve is not shown in detail, but is preferably of the construction shown and described in my co-pending application Ser. No. 421,377, filed December 2, 1941, and which issued as Patent No. 2,363,111 on November 21, 1944. Its essential elements are a valve casing containing a valve body 111 which is normally maintained in central position by suitable springs, as shown. The valve body has two spaced heads which normally close the ports connected to the ends of the cylinders. When shifted to the right the valve connects the pressure line 114 to the right end of the hydraulic cylinder, and when shifted to the left connects the left end of the cylinder to the pressure line, and the other end of the cylinder to the discharge line 113. The line 113 leads to the deceleration valve 99 and thence to the sump, from which oil is returned to the circuit.

The movement of the valve body is controlled by solenoids 115, 116, supported on the valve casing and arranged to operate pilot valves, not shown, but which upon energizing of the solenoid admits pressure from the pressure line to the adjacent end of the valve casing to effect the movement of the valve body 111. That is to say, when the solenoid 115 is energized pressure is admitted to the left end of the valve casing, thereby shifting the valve body to the right and admitting pressure to the right end of the hydraulic cylinder. The solenoids 115, 116 are energized after the index head comes to rest, whereby the movement of the table will occur only when the index head is stationary and likewise the control of the index head latch is effected through the movement of the table in such manner that the index head is held against movement until after the table comes to rest.

The hydraulic control for the indexing head has already been described. The sequence of operations with the control set for indexing at each end of the table movement is as follows: Assuming the table to be moving toward the left as shown in Fig. 12, the right stop finger 93 will engage the movable bar 94 and turn the lever 97 on its pivot. The first movement of the lever serves to shift the knob of the speed regulating and de-celeration valve 99, thereby checking the speed of the table so that it comes to a stop without jar when the lever reaches the end of its movement.

Just before the lever reaches the end of its movement the switch member 103 will be snapped to open the contacts for the valve 116 and close the contacts for the valves 115, through the electric control system which will now be described. The shifting of the lever 103 does not immediately energize the coil of the solenoid 115, but instead the circuit is closed through the relay which controls the movement of the latch 23, lifting the latch and releasing the index wheel so that indexing takes place. As the index wheel nears the completion of its movement the arm 50 is rocked, releasing the control valve for the latch 23, which valve, on returning to its normal position, cuts off in part the discharge line from the fluid motor driving the index head, thereby checking the speed of the index head and permitting the parts to be brought to rest without jar or vibration. When the indexing operation is completed as described the circuit is closed through the solenoid valve 116, which opens its attached pilot valve, delivering fluid under pressure to the right hand end of the valve 110, thereby admitting fluid under pressure to the left end of the hydraulic cylinder which will cause the table to start on its return movement.

Figure 13:
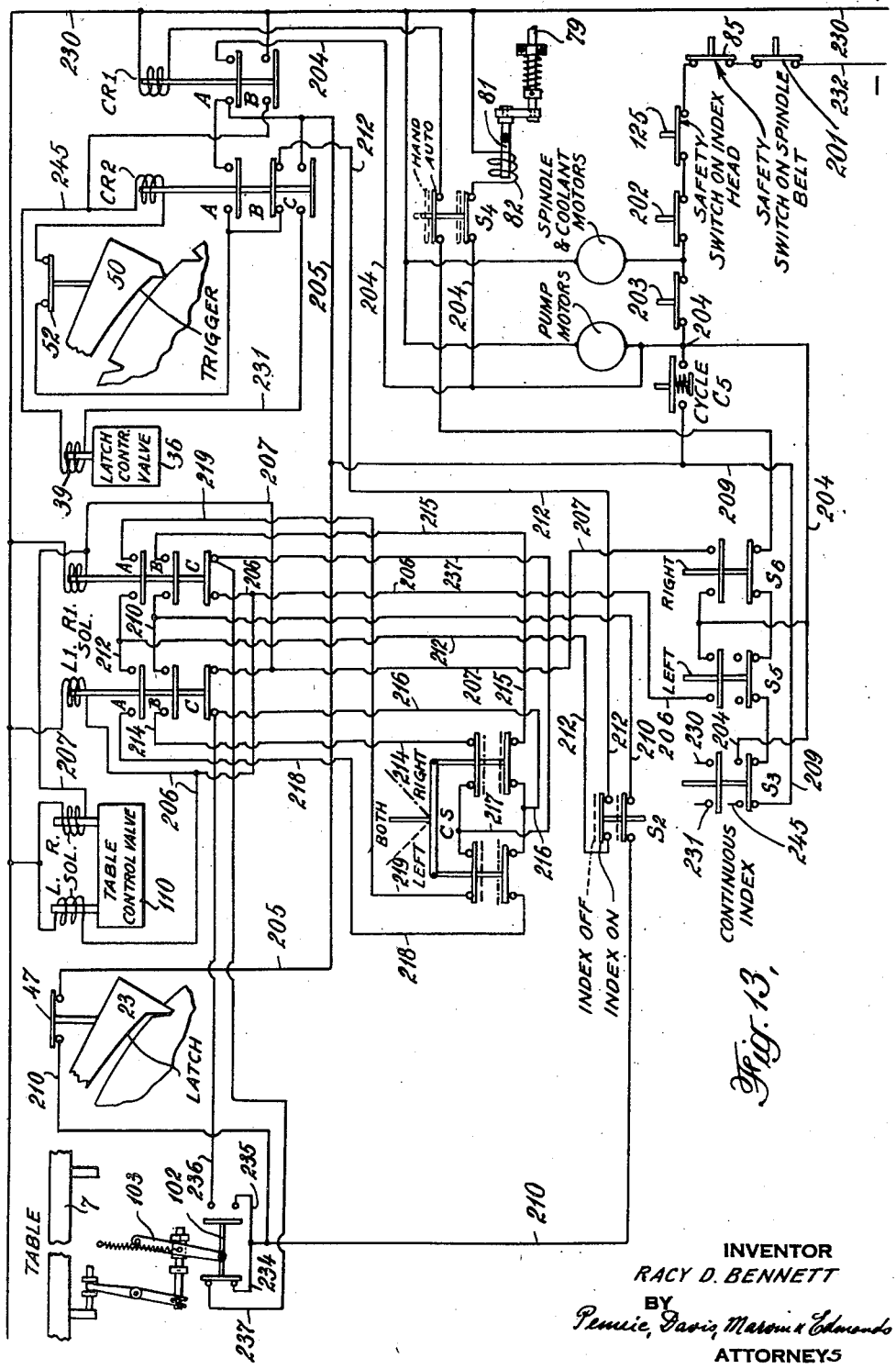
Fig. 13 is a diagrammatic view of the electric circuit whereby the various cycles of operations are automatically obtained.

The control apparatus for effecting the sequence of operations is shown in Fig. 13. The electric control system here disclosed comprises connections whereby the machine may be automatically operated continuously through several different cycles. The machine may be set to index the work at each end of the table movement or it may be set to index the work at one end only of the table movement, either right or left. Connections are also provided whereby the indexing operation may be discontinued without affecting the automatic reciprocation of the table. Also, a control is provided whereby the reciprocation of the table may be discontinued and the index head turned continuously. Connections are also provided whereby the indexing may be controlled by hand and also the movement of the table to the right or left may be controlled through hand-operated switches without disconnecting or resetting the automatic cycle control.

In Fig. 13 various control elements are shown in position for continuous automatic operation with indexing at each end of the table movement. The parts are shown in the positions they occupy when the table has just completed its movement to the right and the indexing has taken place, but before the movement to the left begins. The circuits will be described in the sequence that they would become operative if the machine were started from this position by closing the cycle switch.

The positive and negative sides of the electric control circuit are here represented by conductors 230, 232, respectively. Conductor 232 is connected through the control circuit to the master switch 201 which must be closed by hand before any part of the machine may be set in operation. From the master switch the circuit leads through safety switches 85 and 125 to a second hand switch 202 which controls the operation of the grinding spindle and coolant motors. Thence the circuit leads to a switch 203 which controls the pump motor. A lead 204 from switch 203 constitutes one side of the control circuit. One branch of the circuit 204 leads to switch A of the main cycle relay CR1. This relay has two switches CR1A and CR1B, both of which are normally open but are closed when cycle switch C5 is closed by hand to energize the relay coil through conductor 209 which leads through certain control switches which will be later described, to the coil of the relay.

Energizing the coil of relay CR1 closes both switches CR1A and CR1B. From switch CR1A conductor 205 leads to switch 47 which, as previously described, is actuated by the latch 23 which holds the index wheel against movement. The switch 47 is closed when the latch 23 is in locked position and connects conductor 205 to a lead 210 from which two branches 234, 235, lead to contacts on opposite sides of the two-position switch 102 which controls the table movement. With the table in the position shown the lead 234 is connected by the switch 102 to a conductor 237 which leads to one contact of the switch R1C of the table control relay R1 through which the movement of the table toward the right is effected. This switch R1C is normally closed and through this switch current passes to a conductor 206 which leads to the coil of the relay L1 which controls the movement of the table to the left. The coil of L1 will therefore be energized when the cycle switch is closed and the relay CR1 energized and will lift the relay, closing switches L1A and L1B, and opening switch L1C. At the same time through another branch of 206 the solenoid at the left end of the table control valve 110 is energized, thereby shifting the table control valve in a direction to admit fluid under pressure to the right hand end of the table-operating cylinder, thus causing the table to move to the left.

Closing switch CR1B connects the coil of a second cycle relay CR2 to the positive side 230 of the circuit. The other end of the coil is connected to one terminal of the switch 52 which is actuated by the "trigger" 50 and is closed except when the trigger drops into the notches of the index wheel while the wheel is turning. From the other side of the trigger switch the circuit leads to switch CR2B, which is closed when the coil of CR2 is de-energized, thence through conductor 212 to switch L1A which is closed during the movement of the table from right to left. From the other contact of switch L1A a conductor 218 leads to the cycle-setting switch CS, all four elements of which are closed when indexing is to take place at both ends of the table movement. Through this switch the circuit leads through 216 and 236 to the right hand side of table switch 102 which is open during the movement of the table from right to left. When the table completes its movement from right to left the switch 102 will be shifted to the right, opening the contacts on the left and closing those on the right, thus connecting 236 to 210, thence through the latch switch 47, through 205 to the negative side of the circuit, thus energizing the coil of relay CR2, opening switch CR2B and closing CR2A and CR2C.

Closing CR2C energizes the coil of the latch-control valve 36 through conductor 231 to coil 39 and conductor 245, thereby causing the latch to lift through the action of the piston 35 and rocker 30, releasing the index wheel and opening the latch switch 47. Opening the latch switch de-energizes the coils of the left solenoid of the table control valve and of relay L1, allowing L1C to close and opening L1B and L1A. As the index wheel in under constant torque from its driving motor the indexing wheel will begin to turn and will continue at its maximum speed until the next notch reaches the trigger and the trigger drops into the notch, thus opening the trigger switch and de-energizing the coil of CR2. CR2 drops, opening CR2A which de-energizes the coil of the latch control valve which will be shifted by its spring to cut off the pressure from the latch opening piston 35 and also throttle the return conduit from the operating motor of the index head, reducing the speed of the motor so that the index wheel will come to rest without jar or vibration when the latch drops into the advancing notch.

When the latch is fully seated in the notch the latch switch will close and as the table control switch 102 is now in its right hand position the coils of relay R1 and the solenoid at the right end of the table-control valve will be energized and the table will move to the right. Upon completion of its movement the indexing operations above described will be repeated.

If desired the index wheel may be operated at one end only of the table travel. For this purpose I provide the cycle control switch CS. This switch is designed so that in mid-position all four elements will be closed and when adjusted to left the upper left and lower right will be opened, while the other two elements will be opened when the switch is adjusted in the other direction. Let us assume that the table is moving to the left and the switch CS is set so that no indexing will take place at the completion of the movement in that direction, that is, the switch handle is set in the right hand or dot-and-dash position, as shown in Fig. 13.

With the switch CS set in position with all four elements closed the circuit extended, during the travel of the table toward the left, from conductor 212 to switch L1A to conductor 218, thence through the lower left hand element of switch CS to conductor 236 to the right contact of table switch 102, so that when switch 102 is shifted at the end of the table movement the circuit is closed through the coil of relay CR2, thus energizing the solenoid of the latch control valve and releasing the index wheel and opening the latch switch. With the switch CS adjusted to the right, the circuit from 218 to 236 is broken and consequently the coil of relay CR2 is not energized and the index head is not released. Instead the opening of the contacts 237, 235 at the left of table switch 102 at the completion of its movement to the left immediately de-energizes the coils of L1 and the left solenoid of the table control valve for the hold-in circuit for these coils through 217, 214 and L1B is broken at the upper right hand element of the switch CS which is open when the handle of switch CS is adjusted to its right hand position.

De-energizing these coils returns the table control valve to its middle position and closes L1C, so immediately switch 102 is shifted to the right as the table completes its movement to the left, the coils of the right solenoid of the table control valve and relay R1 will be energized, starting the table on its return movement and closing R1A and R1B. Conductors 219 and 215, respectively, lead from these switches to the lower right and upper left elements of the switch CS and as these switches are closed when the handle of switch CS is adjusted to the right the indexing, when the table reaches the end of its travel toward the right will take place in the manner described.

If it be desired to index only when the table is at the end of its travel toward the left, the switch CS is adjusted to its left hand position, thus closing the circuits controlled by switches L1A and L1B and opening the circuits through R1A and R1B.

In order for the table to be continuously reciprocated without indexing at either end of its travel, a separate switch S2 is provided which, when adjusted to its "off" position breaks the circuits through L1A and L1B and also through R1A and R1B, so that the latch-control valve remains closed and the table-control valve is controlled directly by the table switch 102.

It is sometimes desired to rotate the index wheel continuously without moving the table. For this purpose I provide a switch S3 which, in its normal position of adjustment for cycle operation, closes the circuit through the coil of cycle relay CR1. When adjusted to its "continous" index position, the circuit through the coil of CR1 is broken and a circuit established through one branch of the switch directly from negative lead 204 through a conductor 245 to the coil of the latch-control valve, thence through conductor 231 and the other branch of switch S3 to positive lead 230. The latch is thus held in released position and the circuit through the table-control valve 102 is maintained open. The leads from the switch S3 are omitted for clarity in the Fig. 13, but it will be understood that the terminals are connected to the indicated conductors.

It may also be desired to control the indexing by hand, which of course may be done only when the table is stationary at one end of its movement. In order to control the movement of the index wheel by hand, it is necessary to lift the latch, and this is accomplished by the lever 78 which, as previously described, is locked against motion by the latch 80' and solenoid 82. The coil of this solenoid, as shown in Fig. 13, is controlled by a two-element hand switch S4 one element of which closes the circuit through the coil of the solenoid 82 while the other element is in the circuit of the coil of the cycle relay CR1. By this arrangement the index wheel cannot be released by hand without opening the circuit through the solenoid 82 by means of the switch S4, which switch also opens the circuit through the cycle relay, whereby the table comes to rest at the end of its movement and remains at rest until the circuit is re-established by closing the switch S4.

Means are also provided for controlling the reciprocation of the table by hand. To this end switches S5 and S6 are provided one for each direction of movement of the table. These switches, as shown in Fig. 13, are two-position switches and in one position—the position of each switch for normal cycle operation—they close the circuit through the coil of the cycle relay CR1 so that shifting either switch from cycle operation position releases the relay CR1. In the other position of operation the switch S5 completes the circuit directly through the coils on the left of the solenoid of the table control valve and the relay L1, thereby effecting an immediate movement of the table to the right. In like manner, when the switch S6 is in its non-cycle position, the circuit is completed directly through the coils of the right hand solenoid of the table control valve and the relay R1 and the table will thereby be immediately moved toward the left where it will come to rest and remain at rest until the switch is restored to cycle position.

The above described electric control system gives complete and universal control to the movement of the table, but it will be understood of course that it is not necessary to provide for all the automatic cycles obtainable with this circuit, nor are the various safety devices essential to the operation of the machine, and it will be understood that the electric control circuit may be variously modified within the scope of the invention.

In Figs. 14 and 15 I have illustrated a modified form of index head designed primarily for use when the machine is to be employed for grinding gear teeth or splines by the alternate face method. In carrying out the grinding according to usual methods a grinding wheel is employed which is accurately dressed to the shape and dimensions of the spacing between the two adjacent splines or teeth. The work is indexed to bring the successive spaces between the splines or teeth accurately beneath the grinding wheel and the latter is then lowered into grinding position so as to simultaneously dress the face of two adjacent teeth or keys. It is sometimes desirable to dress one face only at a time. For this purpose a grinding wheel is used which is thinner than the space between the adjacent teeth so that it may be lowered between the adjacent teeth to the bottom of the space between the teeth without contacting the side faces of the adjacent teeth, and then pressed laterally in one direction against one surface to be ground and then laterally in the opposite direction against the other surface to be ground.

In order to carry out this sequence of operations it is necessary not only to turn the work accurately through the required angle, depending upon the number of teeth in the gear, but also to thereafter turn a slight distance first in one direction and then in the other to bring the face to be ground into contact with the side face of the grinding wheel.

In the machine forming the subject-matter of the present application I accomplish this sequence of operations by indexing in the usual manner to effect the movement of the work through the predetermined angle to bring the successive portions to be ground into alignment with the grinding wheel and then effect the supplemental movement of the work by shifting the entire support for the index head by a hydraulic control mechanism such as illustrated in Figs. 14 and 15.

Referring to Fig. 14, it will be seen that the arm 25 which supports the members 24 and 50 and is locked in adjusted position by means of the clamp 26, is provided with an extension 126 projecting through a slot in the top of the housing 8 of the indexing head and is provided with a lug 127 positioned to be engaged by two opposite stop members 128, 129, which are mounted for movement toward and away from each other in a supplemental housing 130 mounted upon the upper face of the index housing 8. The stop members 128 and 129 are internally threaded with right- and left-hand threads, respectively, for receiving an adjusting screw 131 which is similarly threaded and mounted for rotation in an extension of the bore in which the stops 128, 129 are supported. The end of the screw 131 is provided with an extension 131a connected to the main portion of the screw by a tongue-and-slot connection, as shown in Fig. 14, which permits relative longitudinal movement of the screw and extension but connects them for rotative movement. The extension 131a projects beyond the end wall of the housing 130 and is provided with an adjusting knob 132 having a graduated dial for facilitating accurate adjustment of the screw and with a lock nut 133 for locking the screw in adjusted position.

Rotation of the adjusting screw in one direction draws the stop members toward each other to thereby clamp the lug 127 firmly against movement in either direction, while movement in the opposite direction moves the stops equally and oppositely apart to thereby permit a movement of the supporting arm 25 to a limited extent in both directions from the position in which it was locked when the steps were clamped against the lug.

In order to accurately adjust the position of the supporting arm 25 the screw 131, including the stops 128 and 129, can be shifted laterally to accurately position the arm 25 in its normal locked position. To facilitate the accurate movement of the screw to accomplish this adjustment the screw is provided in its bearing portion with a groove 134 for receiving a pin 135 eccentrically mounted on the end of a stud 136 mounted in the side wall of the housing 130. The stud 136 is provided with an adjusting nut 137 and a clamping nut 138 whereby it may be accurately adjusted to thereby, by means of the eccentric pin 135, shift the screw 131 in one direction or the other to properly position the indexing wheel. The stud 135 does not interfere with the rotation of the screw and when once properly positioned the stops 128 and 129 may be moved toward and away from each other to release and clamp the lug 127 and when in clamped position will always maintain the arm 25 in the exact position to which it is adjusted by the eccentric pin 135.

For shifting the support 25 when the stops are released by turning the screw 132 I preferably provide a hydraulic cylinder 139 whose piston 140 engages a pin 141 bearing against the side of the lug 127. The cylinder is connected through a hand valve 142 to the pressure line leading to the operating motor 18 for the index wheel. As explained above, the index wheel is normally maintained under the driving torque of the motor and constantly tends to turn in a counterclockwise direction as viewed in Fig. 14. As the index wheel is normally locked to the support 25 by the member 24, the torque of the motor tends to turn the support likewise to a counterclockwise direction so that when the screw 132 is turned to separate the stops and the clamping nut 26 is released the support 25 and the entire index wheel and connected mechanism will turn in a counterclockwise direction through the distance permitted by the separation of the stops. The piston 140 is, however, of sufficient area to overcome the torque of the hydraulic motor 18 when the piston 140 is subjected to the pressure from the pressure line and thereby when the valve 142 is opened the support 25 will be shifted in a clockwise direction to the full extent permitted by the separation of the stops. In operation the support 25 is accurately adjusted by means of the screw 137 for the normal indexing operation and is clamped in that position by the clamp 26. After the indexing movement which serves to bring the center of the space between the teeth to be ground in proper alignment with the central plane of the grinding wheel, the screw 132 will be turned through the proper arc to separate the stops the desired amount and the clamping nut 26 is released. The torque of the driving motor turns the arm 26 in a counterclockwise direction to bring the lug 127 against the stop 130 which is accurately positioned to bring the surface to be ground in proper position for engagement with the side face of the grinding wheel. After this surface has been sufficiently dressed the valve 142 is opened, admitting pressure to the cylinder 139 and thereby shifting the support 25 in a clockwise direction until the lug 127 engages the stop 129, thereby positioning the surface of the opposite tooth in position to be dressed by the opposite side face of the grinding wheel.

The above described mechanism does not in any way interfere with the ordinary grinding operations wherein the work is held against rotation at each index position throughout the grinding operation.

It will of course be understood that while the above described mechanism represents a typical embodiment of my invention which has been found highly satisfactory in precision grinding, the invention is not limited to the construction shown and described except insofar as recited in the appended claims.

I claim:

1. In a machine tool of the class described comprising an indexing head and a reciprocating table, means for periodically rotating said indexing head, means for reciprocating said table, and an electric control system for automatically effecting the operation of said parts in predetermined sequence, comprising means for adjusting said system to cause the operation of said index head at each end of each movement of said table or at one end only of said movement.

2. In a machine tool of the class described, a reciprocating table, means for operating the same comprising a hydraulic cylinder, means for supplying operating fluid under pressure to said cylinder, control mechanism for controlling the supply of fluid comprising a valve in the discharge line from said cylinder and means for adjusting said valve to partially close said discharge line as the table nears the end of its movement, a second valve for reversing the supply and discharge connections of said cylinder, means for effecting the operation of said second valve at a predetermined time after said table is stationary, said means comprising an electric control circuit for said valve, a switch operated by said table for setting said circuit, a second switch for closing said circuit and means independent of the table movement for controlling said second switch.

3. In a machine tool an indexing head comprising a work-rotating shaft, a motor for operating the same, a notched indexing wheel attached to said shaft, a locking pawl for engaging said notches, means for controlling the motor of the shaft to automatically reduce the speed of the motor immediately prior to the locking of the index wheel, and a support for said pawl and said last named means mounted for adjustment around the axis of rotation of said shaft.

4. In an indexing head for machine tools comprising a work-supporting shaft, an index wheel attached thereto provided in its periphery with spaced notches for locking the work-supporting shaft in different positions, a locking member adapted to successively engage the notches in said wheel to thereby lock the wheel against movement, a hydraulic motor for turning the index wheel and means for reducing the speed of said motor, said means comprising a trip member mounted adjacent the indexing wheel in position to be engaged and tripped by the notches in the wheel as the latter approach their locked position.

5. In an indexing head for machine tools comprising a work-supporting shaft, an index wheel attached thereto provided in its periphery with spaced notches for locking the work-supporting shaft in different positions, a locking member adapted to successively engage the notches in said wheel to thereby lock the wheel against movement, a hydraulic motor for turning the index wheel and means for reducing the speed of said motor, said means comprising a trip member mounted adjacent the indexing wheel in position to be engaged and tripped by the notches in the wheel as the latter approach their locked position, said locking member and said trip member being mounted for adjustment around the axis of rotation of said shaft.

6. In an indexing head for machine tools comprising a work-supporting shaft, an index wheel attached thereto provided in its periphery with spaced notches for locking the work-supporting shaft in different positions, a locking member adapted to successively engage the notches in said wheel to thereby lock the wheel against movement, a hydraulic motor for turning the index wheel, a valve for controlling the speed of said motor, and means for adjusting the valve to reduce the speed of said motor, said means comprising a trip member mounted adjacent the indexing wheel in position to be engaged and tripped by the notches in the wheel as the latter approach their locked position.

7. In a machine tool an indexing head comprising a work-rotating shaft, means for periodically locking said shaft against rotation, a hydraulic motor having a continuously rotating shaft for rotating said shaft and maintaining a constant driving torque on said shaft while it is held in locked position, a reciprocating support for said indexing head, means controlled by the movement of said support for releasing said locking means to permit rotation of said shaft while said support is stationary and means for preventing reciprocation of said support while said shaft is rotated.

8. In a machine tool an indexing head comprising a work-rotating shaft, means for periodically locking said shaft against rotation, a hydraulic motor having a continuously rotating shaft for rotating said shaft and maintaining a constant driving torque on said shaft while it is held in locked position, a reciprocating support for said indexing head, means controlled by the movement of said support for releasing said locking means to permit rotation of said shaft while said support is stationary and means for preventing reciprocation of said support while said shaft is rotated, said means comprising a switch for controlling the drive of said support and connections between said switch and said locking means for shifting said switch upon the movement of said means to locking position.

9. In a machine tool of the class described, an index head comprising an index wheel, means for rotating the same, means for locking said wheel in predetermined positions, a support for said locking means mounted for movement concentric with the axis of rotation of said index wheel, means for adjusting said support to a predetermined position and means independent of said adjusting means for shifting said support in opposite directions from said position of adjustment and restoring said support accurately to said adjusted position.

10. In a machine tool of the class described, an index head comprising an index wheel, means for rotating the same, means for locking said wheel in predetermined position, a support for said locking means mounted for movement concentric with the axis of rotation of said index wheel, means for adjusting said support to a predetermined position and means independent of said adjusting means for shifting said support in opposite directions from said position of adjustment and restoring said support accurately to said adjusted position, said means comprising a source of hydraulic pressure and connections for applying unbalanced hydraulic pressure optionally in opposite directions against said support.

RACY D. BENNETT.

REFERENCES CITED

The following references are of record in the file of this patent:

UNITED STATES PATENTS

| Number | Name | Date |
|---|---|---|
| 1,583,351 | Heald | May 4, 1926 |
| 1,745,460 | Sudhoff | Feb. 4, 1930 |
| 1,850,799 | Junge | Mar. 22, 1932 |
| 1,973,329 | Bullows | Sept. 11, 1934 |
| 2,012,273 | Fraser | Aug. 27, 1935 |
| 2,118,139 | Bath et al. | May 24, 1938 |
| 2,206,492 | Westenberger et al. | July 2, 1940 |
| 2,257,850 | Miller | Oct. 7, 1941 |
| 2,258,510 | Laesaker | Oct. 7, 1941 |
| 2,292,588 | Terbrueggen | Aug. 11, 1942 |
| 2,296,731 | Mustonen | Sept. 22, 1942 |
| 2,349,602 | Baldenhofer | May 23, 1944 |